United States Patent [19]

Nakamura

[11] Patent Number: 4,984,010
[45] Date of Patent: Jan. 8, 1991

[54] IMAGE RECORDING APPARATUS

[75] Inventor: Hiroshi Nakamura, Kanagawa, Japan

[73] Assignee: Fuji Photo Film Co., Ltd., Kanagawa, Japan

[21] Appl. No.: 346,355

[22] Filed: Apr. 28, 1989

Related U.S. Application Data

[63] Continuation of Ser. No. 102,206, Sep. 29, 1987, abandoned.

[30] Foreign Application Priority Data

Sep. 29, 1986 [JP] Japan .................................. 61-230822

[51] Int. Cl.⁵ ........................ G03B 27/32; G03B 27/52
[52] U.S. Cl. ....................................... 355/27; 355/106
[58] Field of Search ....................... 355/106, 107, 27; 430/138

[56] References Cited

U.S. PATENT DOCUMENTS 3,215,055 11/1965 Campbell et al. .................. 355/106
4,620,096 10/1986 Takehara et al. .

Primary Examiner—Monroe H. Hayes
Attorney, Agent, or Firm—Sughrue, Mion, Zinn, Macpeak & Seas

[57] ABSTRACT

An image recording apparatus in which an image on a light-sensitive photographic material is transferred to an image-receiving material by superimposing the materials to bring them into close contact with each other. The apparatus is provided with guide plates for guiding the materials to pinch rollers in such a manner that the materials are kept away from each other before they are fed to the pinch rollers which superimpose the materials and bring them into close contact with each other. Therefore, the materials can be prevented from coming into contact before they are superimposed.

17 Claims, 3 Drawing Sheets

IMAGE RECORDING APPARATUS

This is a continuation of application Ser. No. 07/102,206, filed Sept. 29 1987, now abandoned.

BACKGROUND OF THE INVENTION

The present invention relates to an image recording apparatus which is adapted to provide an image on an image-receiving material by transferring an image recorded on a light-sensitive photographic material to the image-receiving material.

A known example of an apparatus for providing a colored image by employing a heat-developable light-sensitive photographic material is the apparatus disclosed in Japanese Patent Laid-Open No. 75247/1984. This apparatus is adapted to send a heat-developable light-sensitive photographic material to a heat-developing section of the apparatus after the material has been exposed to an image in an exposure section of the apparatus, and transfer the image to an image-receiving material by bringing the image-receiving material into close contact with the light-sensitive photographic material after the image on the light-sensitive photographic material has been heat-developed.

With this image recording apparatus, it is possible to either perform the transferring process alone or simultaneously perform the developing and transferring processes, by bringing the light-sensitive photographic material into close contact with the image-receiving material after the light-sensitive photographic material has been subjected to development.

In order to perform the developing process or the developing and transferring processes, the light-sensitive photographic material and the image-receiving material are brought into close contact with each other by means of pinch rollers. However, if the materials happen to come into contact inadvertently before they are deliberately brought into close contact, even if they are not heated, the contact between the emulsion-coated surfaces of these materials causes gradual development and transfer reactions, thus causing non-uniform treatment.

SUMMARY OF THE INVENTION

In view of the above-described circumstances, an object of the present invention is to provide an image recording apparatus which is capable of holding the light-sensitive photographic material and the image-receiving material in such a manner that they are positively kept separated from each other without any risk of their coming into contact until immediately before they are deliberately brought into close contact.

The present invention provides an image recording apparatus in which a light-sensitive photographic material and an image-receiving material are brought into close contact by pinch rollers of a superimposing section of the apparatus, and in which an image on the light-sensitive photographic material is transferred to the image-receiving material. The apparatus in accordance with the present invention is characterized by comprising guide means disposed immediately upstream of the pinch rollers of the superimposing section for holding the light-sensitive photographic material and the image-receiving material away from each other before they are superimposed.

Therefore, the light-sensitive photographic material is held by the guide means in such a manner that it is positively kept away from the image-receiving material, thereby preventing the developing or transferring process from starting inadvertently.

Preferably, the guide means may have guide plates disposed between the above-mentioned materials, and a pinching means imparting back tension to at least one of the light-sensitive photographic material and the image-receiving material. With this arrangement, since back tension is imparted to the materials, they can be kept tensioned as they are being sent, thereby preventing the materials from becoming loose and inadvertently coming into contact with each other before they are superimposed.

DESCRIPTION OF THE PREFERRED EMBODIMENT

Figure 2:
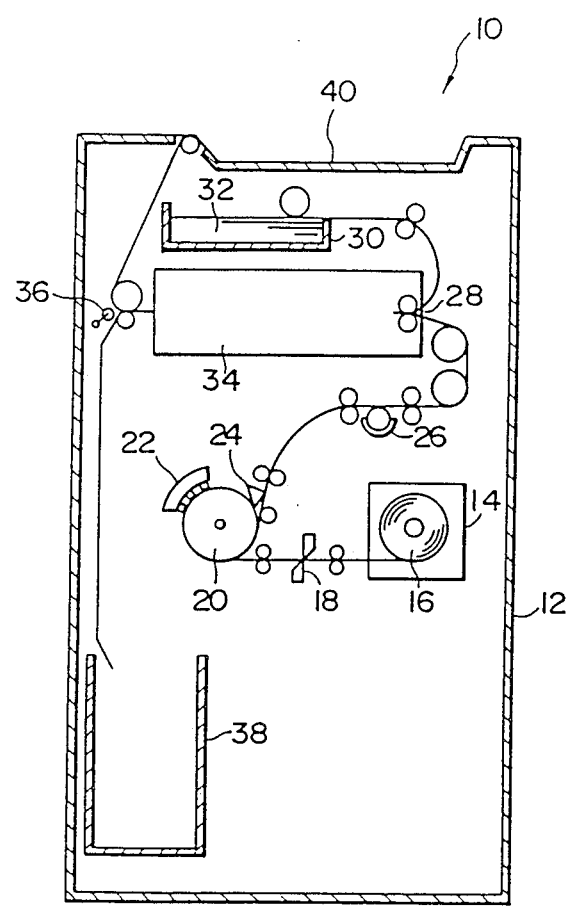
FIG. 2 is a sectional view of the image recording apparatus to which the present invention is applied.

FIG. 2 shows an image recording apparatus 10 in accordance with an embodiment of the present invention.

The image recording apparatus 10 has a housing 12 in which a magazine 14 is provided to accommodate a heat-developable light-sensitive photographic material 16. The light-sensitive photographic material 16 is drawn out from the magazine 14 and cut by a cutter 18 into pieces of a predetermined length. Thereafter, the material 16 is wound around the outer periphery of an exposure drum 20 disposed within the housing 12 so as to be exposed by an exposure head 22, and is then scraped off the drum by a scraper 24. The material 16 is then sent to a water (solvent) coating section 26 wherein water, serving as an image-forming solvent, is coated on an emulsion-coated surface of the material 16, and thereafter, the material 16 is sent to a superimposing section 28.

A cassette 30 receives layers of an image-receiving material 32 which can be sent to the superimposing section 28 where the material 32 is superimposed on the light-sensitive photographic material 16 and then sent to a heat-developing/transferring section 34. A separating section 36 is provided downstream of the heat-developing/transferring section 34 and operates in such a way that, down stream of the separating section 36, the light-sensitive photographic material 16 is sent to a collecting device 38 and the image-receiving material 32 is sent to an outlet 40.

Figure 1:
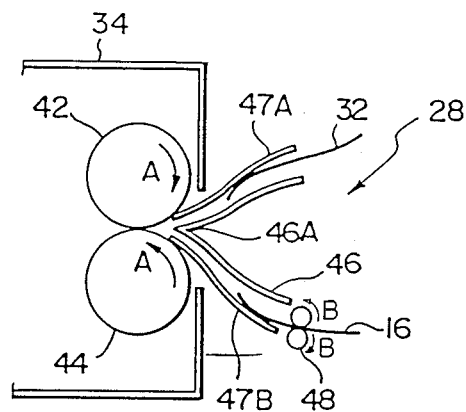
FIG. 1 is an enlarged view of a superimposing section of an image recording apparatus in accordance with the present invention.

The superimposing section 28 will now be described with reference to FIGS. 1 and 3. In this superimposing section 28, a pair of pinch rollers 42 and 44, which serve as superimposing means, are disposed at the entrance of the heat-developing/transferring section 34 and operate in such a way that the light-sensitive photographic material 16 and the image-receiving material 32 sent thereto are superimposed and fed to the heat-developing/transferring section 34. For this purpose, the pinch rollers 42 and 44 are driven by the driving force of a motor (not shown) in the directions indicated by the arrows A.

A guide plate 46 forming part of guide means is disposed immediately upstream of the pinch rollers 42 and 44. The guide plate 46 is formed of a thin plate material which is bent approximately into a V-shaped form, with a bent portion 46A in the middle thereof being disposed close to the portion of contact between the pinch rollers 42 and 44 in such a way that it points into the portion of contact. In addition, auxiliary guide plates 47A and 47B are disposed in such a way that they face the sides of the approximately V-shaped guide plate 46, as shown in FIG. 1.

In practice, the angle at which the guide plate 46 is bent approximately into the V-shaped form should preferably be between about 20 and 90 degrees.

By virtue of the provision of the guide plate 46 and the auxiliary guide plates 47A and 47B close to the pinch rollers 42 and 44, the light-sensitive photographic material 16, which is sent thereto after passing through the water-coating section 26, and the image-receiving material 32, which is sent thereto from the cassette 30, can be kept away from each other until immediately before they are pinched and superimposed by the pinch rollers 42 and 44, thereby preventing the risk of the developing process starting owing to inadvertent contact between these materials.

A tension roller 48 is disposed close to one side of the guide plate 46 and the auxiliary plate 47B and operates in such a way that the light-sensitive photographic material 16 is sent to the guide path for the material 16 defined by the one side of the guide plate 46 and the auxiliary guide plate 47B, and also the material 16 is given a certain back tension which acts in the direction opposite to that in which the material 16 is being fed. This tension roller 48 first acts to send the light-sensitive photographic material 16, which has been sent from the previous process, forward between the pinch rollers 42 and 44, but once the forward end portion of the material 16 is pinched by these rollers 42 and 44, it acts to impart a back tension to the material so as to make the material tensioned. This action of the tension roller 48 is produced by, for instance, rotating it at a speed lower than the feed speed of the material 16, stopping it, or rotating it in the directions indicated by the arrows B. Consequently, a portion of the material 16 which is immediately behind the pinched portion is slightly wound around the periphery of the pinch roller 44, thus further ensuring that light-sensitive photographic material 16 and the image-receiving material 32 are held away from each other.

Another tension roller which is similar to this tension roller 48 may also be provided and disposed adjacent to the other side of the guide plate 46 and the auxiliary guide plate 47A to impart a back tension to the image-receiving material 32 as well.

Figure 3:
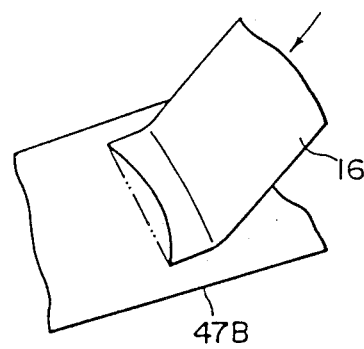
FIG. 3 is a perspective view showing the positional relationship between a light-sensitive photographic material and an auxiliary guide plate.

FIG. 3 shows the light-sensitive photographic material 16 being guided by the auxiliary guide plate 47B. Because the emulsion-coated surface of the material 16 has been coated with water in the water-coating section 26 of the previous process, that surface of the material is curled up in the longitudinal direction, as shown in FIG. 3 by the solid line. Therefore, there is a risk that this surface of the material 16 may be damaged when it comes into contact with the guide plate 46. However, after the material 16 has come into contact with the auxiliary guide plate 47B, the curl of the surface is eliminated, as indicated by the virtual line in FIG. 3, and the material 16 is thus sent to the pinch rollers 42 and 44 in a condition in which the curled surface configuration has been corrected. The surface of the image-receiving material 32 may also curl owing to contraction of the gelatin layer caused by the effects of temperature and humidity. Such a curl of the material 32 can be eliminated by bringing the material 32 into contact with the guide plate 46 or the auxiliary guide plate 47A, and the material 32 is thus sent to the pinch rollers 42 and 44 with its surface relieved of the curl.

The operation of the apparatus in accordance with the embodiment of the invention will now be described.

The light-sensitive photographic material 16 drawn out from the magazine 14 is wound onto the exposure drum 20, and, after the material 16 has been exposed by the exposure head 22, the exposed surface of the material 16 is coated with water in the water-coating section 26, and the material 16 is then sent to the superimposing section 28.

Meanwhile, the image-receiving material 32 which is received in the cassette 30 is sent therefrom to the superimposing section 28. After the image-receiving material 32 has been superimposed on the light-sensitive photographic material 16 in the superimposing section 28, the materials 16 and 32 are sent to the heat-developing/transferring section 34 where the materials 16 and 32 are heated, and developing and transferring operations are performed.

As stated before, in the superimposing section 28, since the guide plate 46 holds the light-sensitive photographic material 16 and the image-receiving material 32 away from each other, the light-sensitive photographic material 16 and the image-receiving material 32 are prevented from inadvertently coming into contact with each other and starting the developing process before they are fed to the heat-developing/transferring section 34.

The developing and transferring operations are performed in the heat-developing/transferring section 34 so that the image on the light-sensitive photographic material 16 is transferred to the image-receiving material 32. The light-sensitive photographic material 16 is then sent to the collecting device 38, while the image-receiving material 32 is sent to the outlet 40.

Although in the foregoing embodiment, it is the light-sensitive photographic material 16 that is coated with water, this is not limitative. The present invention may also be applied to an apparatus in which the image-receiving material 32 is coated with water.

As described above, in the image recording apparatus in accordance with the present invention, a light-sensitive photographic material and an image-receiving material are brought into close contact by pinch rollers of a superimposing section of the apparatus, and an image on the light-sensitive photographic material is transferred to the image-receiving material. Since the apparatus comprises guide means disposed immediately upstream of the pinch rollers of the superimposing section for holding the light-sensitive photographic material and the image-receiving material away from each other, any risk that the light-sensitive photographic material and the image-receiving material may inadvertently come into contact with each other before they are superimposed for operations such as developing and transferring is prevented.

What is claimed is:

1. An image recording apparatus in which a light-sensitive photographic material having at least one emulsion coated surface and an image-receiving material having at least one emulsion coated surface are superposed to have their respective emulsion brought into close contact with each other so that an image on said light-sensitive photographic material is transferred to said image-receiving material at a heat developing/transferring section, the image recording apparatus comprising:
  superimposing means for superposing said light-sensitive photographic material and said image-receiving material and bringing them into close contact with each other, disposed upstream of the immediately adjacent to said heat-developing/transferring section;
  back tension imparting means for imparting back tension to both of said light-sensitive photographic material and said image receiving material, said back tension means comprising for each material a pair of tension rollers disposed upstream of said superimposing means and rotating at a slower speed than said material; and
  guide means for guiding said light-sensitive photographic material and said image-receiving material in such a manner that the emulsion coated surface of said material are kept away from each other so as to prevent said light-sensitive photographic material and said image-receiving material from unexpectedly gradually developing until they are deliberately brought into contact by said superimposing means prior to being heated at said heat-developing/transferring section as they are fed in a common direction,
  wherein said guide means is disposed upstream of and directly adjacent to said superposing means in a direction opposite a direction in which said light-sensitive photographic material and said image-receiving material are fed.

2. An image recording apparatus according to claim 1, wherein said guide means includes a first guide plate disposed between said light-sensitive photographic material and said image-receiving material.

3. An image recording apparatus according to claim 1, wherein said superimposing means comprises a pair of pinch rollers.

4. An image recording apparatus according to claim 2, wherein said back tension imparting means includes a pair of tension rollers for pinching one of said materials so that the material is tensioned.

5. An image recording apparatus according to claim 3, where said guide means comprises a first guide plate which is bent approximately into a V-shaped form, with a bent portion thereof being disposed close to the portion of contact between said pinch rollers.

6. An image recording apparatus according to claim 5, wherein said guide means further includes second guide plates each facing one of the sides of said V-shaped first guide plate, each of said second guide plates and the corresponding one of the sides defining a gap through which one of said material is guided.

7. An image recording apparatus according to claim 6, wherein said bent portion of said first guide plate is bent at an angle of between about 20 to 90 degrees.

8. An image recording apparatus in which a heat-developable light-sensitive photographic material having at least one emulsion coated surface is exposed to an image, said image to which said material is exposed is heat developed, and said heat-developable light-sensitive photographic material and an image-receiving material having at least one emulsion coated surface are superposed to have their respective emulsion coated surface brought into close contact with each other so that said image thus heat-developed is transferred to said image-receiving material at a heat developing/transferring station, the image recording apparatus comprising:
  a pair of pinch rollers for superposing said light-sensitive photographic material and said image-receiving material and bringing them into close contact with each other, disposed upstream of and directly adjacent to said heat-developing transferring section; and
  guide means for guiding said light-sensitive photographic material and said image-receiving material to said pinch rollers in such a manner that the emulsion coated surfaces of said materials are kept away from each other until just before they are deliberately superposed and brought into close contact so as to prevent said light-sensitive photographic material and said image-receiving material from unexpectedly gradually developing until they are deliberately superposed and brought into contact at said heat-developing/transferring section wherein said guide means includes a first guide plate disposed between said light-sensitive photographic material and said image-receiving material, and back tension imparting means comprising for each material a pair of tension rollers for imparting back tension to said material each pair of said rollers rotating at a slower speed than said each material.

9. An image recording apparatus according to claim 8, wherein said back tension imparting means is operative for pinching said material so that the material is tensioned between said pinch rollers and said tension rollers.

10. An image recording apparatus according to claim 8, wherein said first guide plate is bent approximately into a V-shaped form, with a bent portion thereof being disposed close to the portion of contact between said pinch rollers.

11. An image recording apparatus according to claim 10, wherein said guide means further includes second guide plates each facing one of the sides of said V-shaped first guide plate, each of said second guide plates and the corresponding one of the sides defining a gap through which one of said material is guided.

12. An image recording apparatus according to claim 11, wherein said bent portion of said first guide plate is bent at an angle of between about 20 to 90 degrees.

13. An image recording apparatus having an exposure section in which a heat-developable light-sensitive photographic material having at least one emulsion coating surface is exposed to an image, a solvent coating section in which said heat-developable light-sensitive photographic material thus exposed to said image is coated with an image-forming solvent, a superimposing section in which said heat-developable light sensitive photographic material thus coated with said solvent and an image-receiving material having at least one emulsion coated surface are superimposed to be brought into close contact with each other, and a heat developing/transferring section in which said materials thus superimposed in close contact are heated so as to develop said image and transfer said image thus developed from said heat-developable light-sensitive photographic material to said image-receiving material, the image recording apparatus comprising:
  a pair of pinch rollers disposed in said superimposing section for superimposing said light-sensitive photographic material and said image-receiving material and bringing them into close contact with each other, said superimposing section being disposed upstream of and directly adjacent to said heat-developing/transferring section; and guide means for guiding said light-sensitive photographic material and said image-receiving material to said pinch rollers in such a manner that the emulsion coated surfaces of said materials are kept away from each other as they are fed in a common direction so as to prevent said light-sensitive photographic material and said image-receiving material from unexpectedly gradually developing until they are deliberately superposed by said pinch rollers at said heat-developing/transferring section, wherein said guide means is disposed upstream of and directly adjacent to said pinch rollers in a direction opposite a direction in which said head-developable light-sensitive photographic material and said image-receiving material are fed wherein said guide means includes a first guide plate disposed between said light-sensitive photographic material and said image-receiving material, and back tension imparting means comprising for each material a pair of tension rollers for imparting back tension to said materials, each pair of said rollers rotating at a slower speed than said each material.

14. An image recording apparatus according to claim 13, wherein said back tension imparting means is operative for pinching said material so that the material is tensioned between said pinch rollers and said tension rollers.

15. An image recording apparatus according to claim 14, wherein said first guide plate is bent approximately into a V-shaped form, with a bent portion thereof being disposed close to the portion of contact between said pinch rollers.

16. An image recording apparatus according to claim 15, wherein said guide means further includes second guide plates each facing one of the sides of said V-shaped first guide plate, each of said second guide plates and the corresponding one of the sides defining a gap through which one of said materials is guided.

17. An image recording apparatus according to claim 16, wherein said bent portion of said first guide plate is bent at an angle of between about 20 to 90 degrees.

* * * * *